W. W. EDGERTON.
HARROW.
No. 184,199. Patented Nov. 7, 1876.
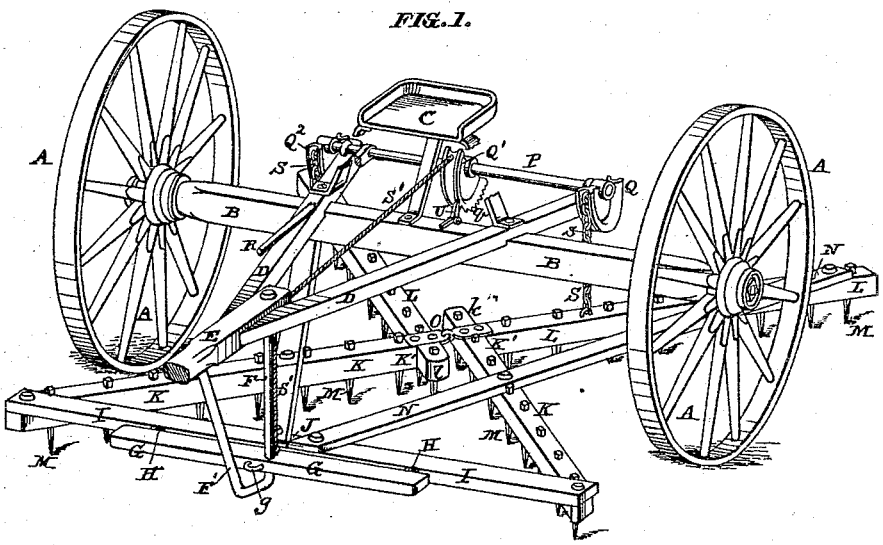
FIG. 1.
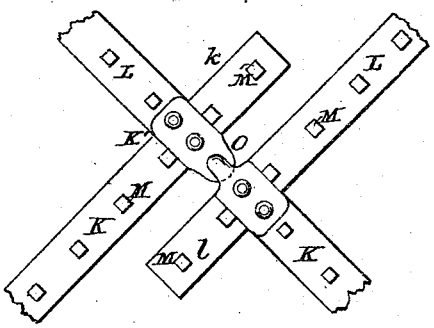
FIG. 3.
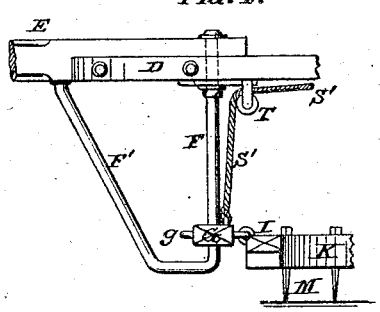
FIG. 2.
FIG. 4.
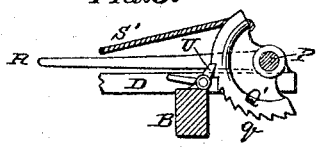
FIG. 5.
ATTEST:
Robert Burns.
Le Blond Burdett.
INVENTOR:
William W. Edgerton
By Knight Bro.
Attys

UNITED STATES PATENT OFFICE.

WILLIAM W. EDGERTON, OF WHEELING, ASSIGNOR TO HIMSELF, JAMES C. GISH, AND BENJAMIN F. DILLIN, OF LIVINGSTON COUNTY, MISSOURI.

IMPROVEMENT IN HARROWS.

Specification forming part of Letters Patent No. 184,199, dated November 7, 1876; application filed May 4, 1876.

*To all whom it may concern:*

Be it known that I, WILLIAM W. EDGERTON, of Wheeling, Livingston county, State of Missouri, have invented a certain new and useful Improvement in Harrows, of which the following is a full, clear, and exact description, reference being had to the accompanying drawings, making part of this specification.

This is an improvement on sulky-harrows.

My improvement consists, first, in the form and construction of the harrow which works the whole surface of the ground, and is so made as to permit the operator to walk just in the rear of the axle. This construction does away with an element of danger in wheel-harrows—namely, the injury resulting from a fall backward from the seat—there being, in my improvement, no part of the harrow extending back of the seat at the middle to such an extent as to endanger a person falling.

The harrow is made in two sections, connected together by hinges. In each section the bars containing the teeth are framed together in a V form, the apex of which points inward, and between whose legs the wheels are located. To the end of the front leg of this V-frame (in each section) is attached the outer end of the front bar, and the inner end of the latter is connected by an oblique bar to the end of the rear leg, and also to the front bar or leg of the V-frame.

The joints connecting the harrow-sections are made at the angles of the V-frames, and at the inner ends of the front bars of the sections. These front bars are connected to the ends of the draw-bar by draw-links.

My improvement also relates to the devices for raising the harrow from the ground. This is done by turning a shaft carrying three grooved sectors. Attached to the sectors are chains or cords, which are connected to the harrow-sections and the draw-bar, so as to raise the harrow from the ground as the sectors are turned upward and backward.

Figure 1 is a perspective view of my invention. Fig. 2 is a back elevation of the front hinge, connecting the two sections. Fig. 3 is a top view of the rear-section hinge. Fig. 4 is a detail showing the connection of the draw-bar to the harrow and to the lifting cord or chain. Fig. 5 shows the ratchet-sector, by which the draw-bar is raised, and the pawl for holding it back, and thus causing the continued suspension of the harrow.

A A are the ground-wheels, upon an axle, B. C is the seat; D, the tongue-hounds, and E the tongue. F is a round rod or pin, extending downward from the tongue, and which is stiffened by a forwardly-inclined brace, $F'$, extending from its lower end to the tongue, as shown. The pin or rod F passes through the draw-bar G, and the draw-bar has vertical movement thereon. $g$ is a staple at the mid-length of the draw-bar, for the connection of the double-tree. The ends of the draw-bar are connected, by links H H, to the fore bars I I of the harrow-sections, and the two bars I I are connected together at their inner ends by a hinge, J. Each section consists, beside the fore bar I, of two oblique bars, K L, containing the teeth M, and a top bar, N, connecting the inner end of the bar I with the rear end of the bar L, and also secured to the bar K. The bars K L are secured together at $K'$, and extend outward from that point, inclining, respectively, forwardly and backwardly, so as to give place for the wheel A between the ends. The two harrow-sections are connected together by the hinge J aforesaid and a hinge, O, at $K'$. The bar K of one section extends back past the hinge at $k$, and the bar $l$ of the other section extends forward of the hinge at $l$, for the support of the teeth M. P is a shaft, having bearings at the rear of the axle, and carrying three grooved sectors, $Q\ Q^1\ Q^2$. R is a lever, by which the shaft O is turned in its bearings. The sectors Q and $Q^2$ carry chains, which lie in the grooves, and whose upper ends are attached to the sectors, and their lower ends to the bars N of the two harrow-sections, respectively, so that as the sectors are rolled upward and backward the chains S are carried up by the sectors and raise the harrows. To the sector $Q^1$ is attached the rear end of a cord or chain, $S'$, which passes through an eye, or over a pulley, T, beneath the tongue, and extends to the draw-bar G, to which the front end is attached, so that when the chains or cords S are drawn upward the front end of the cord or chain S' will be simultaneously drawn up, and thus, by moving the lever R backward, the harrow will be raised from the ground at all parts.

When the harrow is raised the pawl U may be made to engage with the teeth $q$ at the periphery of the sector $Q^1$, so as to prevent the downward movement of the sectors, and so sustain the harrow in its elevated position.

I claim—

1. The harrow-section constructed of bars I K L N, arranged together substantially as described, in combination with the rod F and draw-bar G.

2. The combination, with the wheels A and axle B, of the bars L L, arranged obliquely, so as to leave a space rearward from the middle of the axle, as and for the purpose set forth.

3. The combination of the harrow-lifting chains or cords S S', sectors Q $Q^1$ $Q^2$, shaft P, lever R, and draw-bar G, substantially as and for the purpose set forth.

WILLIAM W. EDGERTON.

Witnesses:
 E. A. BAWER,
 I. A. LEMMON.